Patented Dec. 10, 1929

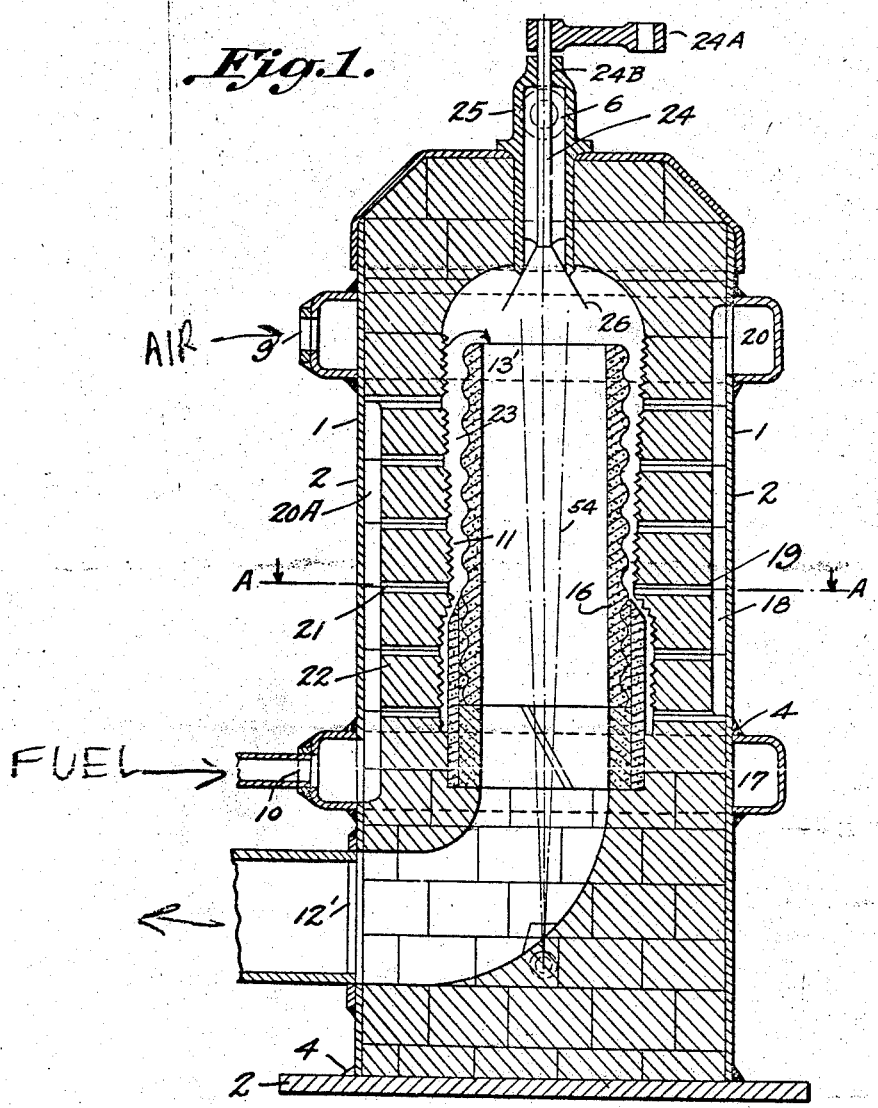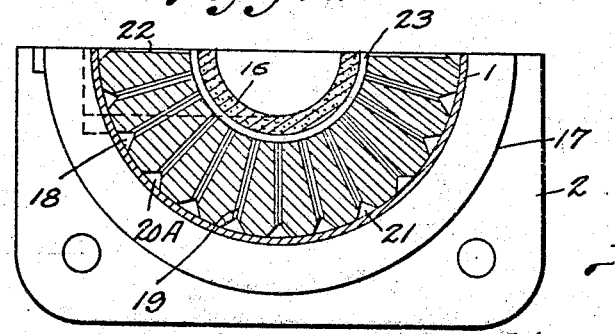

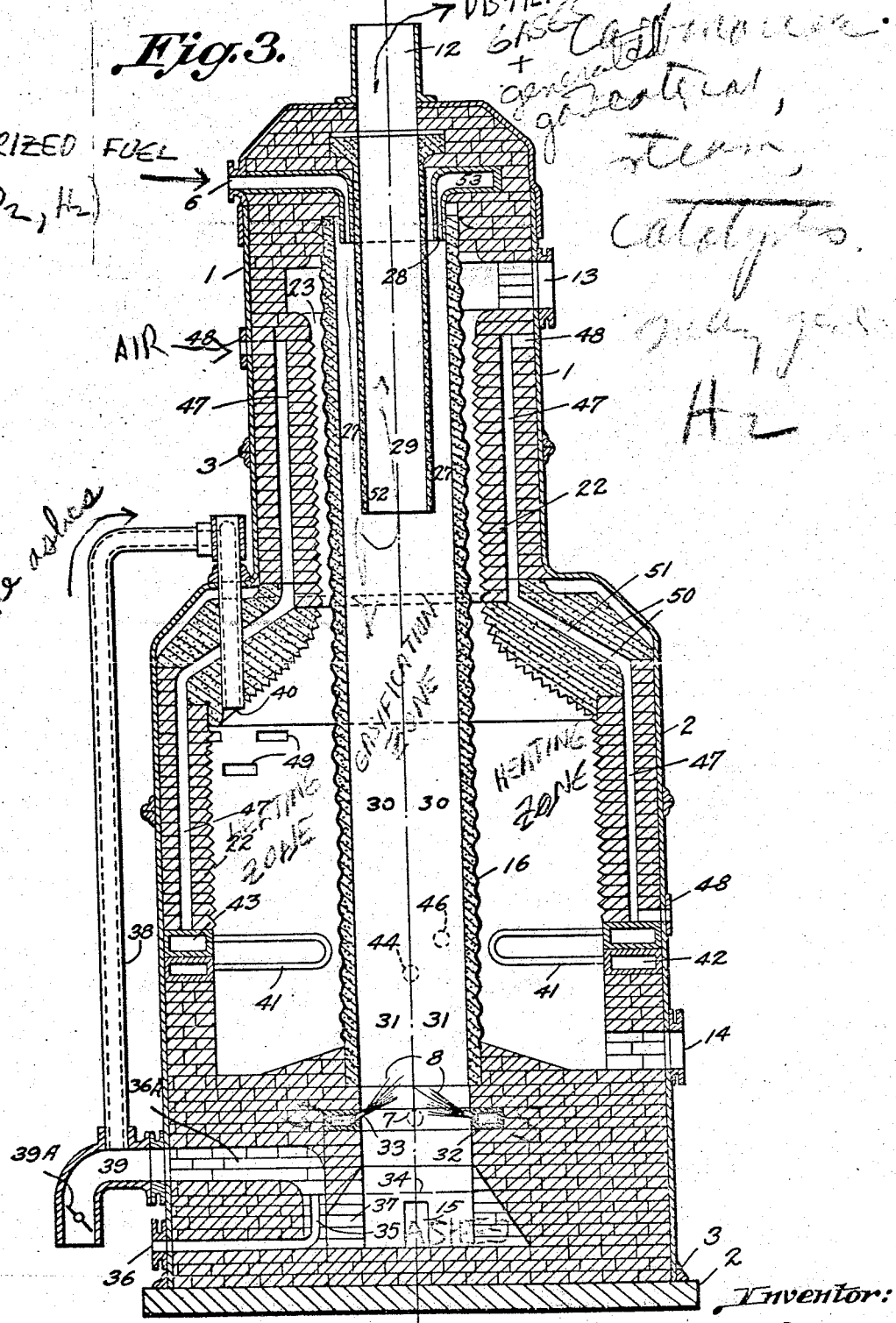

1,738,620

UNITED STATES PATENT OFFICE

FRED UMPLEBY, OF LOCKWOOD, HUDDERSFIELD, ENGLAND

CATALYTIC GAS GENERATOR

Application filed January 29, 1927, Serial No. 164,392, and in Great Britain January 29, 1926.

This invention relates to the manufacture of gases of a combustible nature from such fuels as charcoal, coal, coke, lignite, peat, tar, bituminous, or animal, mineral, or vegetable oils; or vegetable matter, or dusts.

My invention comprises improved and simplified apparatus in which the solid or liquid carbonaceous materials are continuously gasified as they are passed through an externally grooved refractory gasification or distillation chamber situated in a furnace heated by means of gaseous liquid or pulverized fuels, the said apparatus being constructed and arranged so as to utilize the accelerating catalytic influence of an incandescent surface upon combustion and to increase the amount of active incandescent surface by externally grooving or otherwise roughening the receptacle and the interior surface of the heating chamber, and thus completing the combustion of the fuel used to heat the heating chamber at increased rates and temperatures.

My research upon this type of gas generator heating chamber indicates that high temperatures are rapidly attainable and that if failure of the refractory receptacle is to be obviated the receptacle and heating chamber must be equally heated throughout their operative length, and that equal heating may be attained by distributing the combustible mixture of fuel and air to the heating chamber equally throughout its operative area; or when pulverized fuels are utilized to heat the heating chamber, combustion may be commenced in a heating chamber of relatively large volume and be completed in a heating chamber of much smaller volume at increased gas velocities under incandescent surface combustion conditions. The heating chamber is arranged within a gas generator shell or body provided with apertures or nozzles or the like for the admission to their respective channels, of the fuel and air for heating the heating chamber; the materials to be gasified along with their transporting or injecting air or gas streams, and any air, gas, steam, or water vapor, participating in the thermochemical gas reactions taking place within the gas generator, and apertures for the emission of the products of combustion from the heating chamber, the gases generated, and any ash or residue from the materials being gasified or from the heating chamber fuels.

Solid carbonaceous materials are first pulverized in a pulverizing machine until they will pass through a sieve having 100 to 200 meshes per inch and then fed into the generator at its upper end in a continuous dispersed stream and their volatile content first distilling out the resultant gases are removed, whilst the incandescent residue of carbonaceous coke-like particles being comparatively heavy pass forward along the receptacle to meet and react with superheated steam from the steam screen to form combustible gas which also passes out of the generator along with the distilled gases, and any remaining ash or residue finally passes through the steam screen losing much of its sensible heat to superheat the steam and being cooled sufficiently during its progress to prevent adhesion prior to its discharge from the generator by means of a rotating and sealing trough apparatus, or by means of a submergible and sealed compressed air or steam ejector.

The products of combustion from the incandescent surface combustion heating chamber may pass into the gas generation zone where their sensible heat content is utilized to heat the material being gasified and their $CO_2$ content is converted to $CO$ in contact with the high temperature particles of pulverized fuel, but, when it is desired to generate gas free from atmospheric nitrogen and of high thermal value, a separate outlet for the products of combustion from the heating chamber may be provided, and, in addition, the amount of steam admitted to the generator may be restricted and the coke particles be only partly consumed in the receptacle, the residue being wholly or partly diverted to the heating of the heating chamber, or formed into briquettes at the base of the generator whilst still hot.

The pulverized fuel may be transported into the heating chamber and gasification or distillation chamber by means of a transporting stream of air or other gas such as gas generated in the generator, or inert gas such as nitrogen or by carbon dioxide or products of combustion from the heating chamber, or steam, and the transporting gas stream may collect the fuel in the pulverizing machine as they pass together through the machine or it may collect the fuel in a previously pulverized condition from the supply pipes or storage bins of a pulverized fuel system, or the transporting or injecting gases and pulverized fuels may be mixed at their point of entry into the generator.

Liquid and colloidal carbonaceous materials, the colloidal material being ground in a colloidal mill, may be fed into the generator in the form of a thin film or a spray and gasified in a similar manner to the pulverized materials, and calcareous materials such as chalk, lime or limestone, may also be pulverized and fed into the generator along with any of the carbonaceous materials as they have advantageous physical and catalytic influences at high temperatures in addition to giving off $CO_2$ which is converted to CO when in contact with high temperature carbonaceous materials, and the generator may also be constructed and arranged to gasify unpulverized carbonaceous and calcareous materials.

The generator may be arranged to operate and yield gases varying in quality from a straight coal or crude oil gas to a gas as lean as blast furnace gas by varying the amount of oxygen participating in the thermo-chemical gas reactions taking place in the generator, the oxygen being admitted to the gasification zone by such means as the material transporting gas stream, the $CO_2$ content of the heating chamber products, the steam or water vapor in the steam screen, and the amount of calcareous material mixed with and admitted to the generator along with the carbonaceous material or by means of $CO_2$ generated separately from the calcareous material, and, where required, by the utilizing the $CO_2$ content of the gases exhausted from an internal combustion engine, separate apertures may be provided for the admission of oxygen or oxygen-carrying materials or gases.

The amount and proportions of the respective materials and gases admitted to the generator to participate in the thermo-chemical gas reactions and heating of the heating chamber are controlled by means of throttle or the like valves fitted to the respective inlets of the generator and pulverizing or fuel drying machine, and these valves may be controlled or set by hand separately, or they may be interconnected and arranged to operate by hand or automatic mechanical means. The combination of high temperature of operation and the increased area of the particles of material being gasified due to pulverization, and the dispersion of the materials will give a high and rapid yield of gas the quality and quantity of which yield may be further controlled by the use of catalysts such as aluminum, cerium, chromium, cobalt, copper, iron, iridium, lime, manganese, molybdenum, nickel, osmium, platinum, tungsten, zinc, or their salts or oxides or the like, in the gasification chamber or its lining, or in the gas enrichers, or gas coolers, or gas outlet tubes or outlet or mixing zones. The material being gasified may be showered through the generator with a rotary movement or the direction of its flow may be reversed within the generator so as to prolong the period taken to pass the material through a generator of any given length, and the gasification process as a whole may be carried out in stages in separate receptacles and the whole process be completed in a number of receptacles heated separately or by a single furnace, thus permitting any single process to be carried out under ideal thermo-chemical catalytic conditions to give any desired separate or final gas yield from a variety of carbonaceous materials, or vegetable matter or dusts.

The heating chamber of the generator is initially heated or started up by means of volatile liquid fuels, or from a supply or storage of gaseous fuel, subsequent to which it may be operated as an independent unit upon gases generated in the generator, or by liquid fuels similar to the liquid carbonaceous material being gasified, the fuel and air for heating the heating chamber may be distributed throughout the heating chamber by means of a series of separate interconnected longitudinal and radical passages which convey the gas and air separately into the heating chamber where the numerous gas and air streams finally mix and burn with an intense radiant heat around the grooved refractory receptacle.

Alternately, the fuel and air for heating the heating chamber may be injected into an enlargement of the base of the heating chamber through a series of nozzles along with a supply of primary air and its combustion be completed by means of secondary air, preheated in a space situated in the walls of the generator heating chamber in a comparatively small passage around the grooved refractory receptacle under incandescent surface combustion conditions.

The heat losses to the exterior of the generator are reduced by preheating the heating chamber fuel and air streams as they pass through the fuel and air channels and passages and the air space formed in the walls of the heating chamber, and the temperature of the heating chamber is correspondingly increased and the life of the refractory walls is also increased. The materials to be gasified are fed into the receptacle through dispersion nozzles or valves under the influence of suction or by means of a pressure head of the liquid material, or by mechanical pressure generating pumps or the like, or by means of compressed air, gas, steam, or the like; whilst lignite, peat, and the like, may be injected and gasified whilst in a damp or greenish state.

The generator may be operated either above or below atmospheric pressure or partly above and partly below atmospheric pressure, i. e. the heating chamber may be operated below atmospheric pressure whilst the thermo-chemical gas reactions in the receptacle are carried out above atmospheric pressure; and advantage can be taken of these pressures to utilize the gas generated, i. e. the gases generated under these conditions may be injected at and by means of the generator pressure into the combustion chambers of an internal engine, turbine, or machine, or consumed in the form of a flame submerged in the water of a steam generator, or in the steam of a steam superheater, or for welding metals or the like, or the gases generated may be consumed at comparatively low pressures for any known commercial purpose, or town gas, or in the furnace of an ordinary or surface combustion heated steam generator, and, as the generator operates at high temperature, conditions are particularly favorable to the production of carbonmonoxide and hydrogen which may be converted by catalytic means to hydrocarbon gases, or they may be utilized for the manufacture of pure hydrogen, synthetic ammonia, or for the generation of gases for catalytic conversion to volatile and heavy liquid fuels, or lubricants. The receptacles are made from such highly refractory materials as electrically fused alumina, silicon-carbide, magnesia, silica, or from hafnium, zirconium, or fireclays, or the like, or from heat resistant iron or steel alloy, or nickel, whilst the body or shell of the generator may be lined with these refractories or with heat insulating materials such as diatomaceous earths, asbestos, or the like, and these materials may be impregnated with the catalytic materials. The gas generator, heating chamber, and receptacles may be of any convenient form or shape that facilitates their manufacture and operation and the heating chamber may be fed with fuel and air from the center of the generator towards its exterior and the receptacle may surround the heating chamber instead of the heating chamber surrounding the receptacle without departing from this invention.

In order that my invention may be clearly understood and readily carried into effect the same will now be described more fully with reference to the accompanying drawings, which show by way of example, sectional views of gas generators constructed in accordance with my invention.

Throughout the drawings and specification like figures or letters refer to like parts of the invention, and it will be understood that any peculiar features described as appertaining to the liquid or pulverized fuel generators are not strictly limited to that generator, as any one of these features may be adapted to either type of generator.

Of the said drawings Fig. 1 is a vertical section view of a generator arranged for the gasification of colloidal and liquid fuels.

Fig. 2 is a horizontal section at A—A Fig. 1.

Fig. 3 is a vertical section view of a generator arranged for the gasification of pulverized fuels.

Referring to the said drawings:—

The outer casing or body 1 of the gas generator is made of steel plates or the like 2 riveted or bolted together by means of angle plates or the like 3, Fig. 3, or welded as at 4, or it may be made of reinforced or unreinforced concrete, whilst at 6 is the aperture provided for the introduction of the material to be gasified and at 7 is the steam inlet for the steam screen 8, whilst at 9 is the air and at 10 is the fuel inlet to the heating chamber 11; at 12 is the outlet for the gases generated, and at 13 is the outlet for the products of combustion from the heating chamber 11, whilst at 14 an outlet for the ash or residue from the heating chamber 11 and another at 15 for the ash or residue from the refractory receptacle 16 is provided. In Fig. 1, 12' and 13' represent respectively the outlet for the gases generated and the direction of outlet flow of the products of combustion from the heating chamber 11 and in Fig. 1, the outlet 12' serves for both the generated gases and the products of combustion. The receptacle 16 is of catalytic material and is corrugated so that when it is heated to incandescence, surface combustion will result, which is practically flameless.

Referring now to Figs. 1 and 2; at 10 the gaseous fuel for heating the heating chamber 11 is fed into a distribution channel 17 which is connected to a number of longitudinal channels one of which is shown at 18 in Fig. 1 and a different one being shown at 18 in Fig. 2 which in turn feed a number of radial feed channels one of which is shown at 19 in Fig. 1 and a different one being shown at 19 in Fig. 2, the air for the combustion of the fuel heating the heating chamber is fed to the heating chamber in a similar manner to the fuel from its inlet aperture 9 along the channels 20, 20A and 21, but these longitudinal fuel and air channels are arranged alternately so that the fuel and air does not mix until they meet in the heating chamber 11, or passage 23, where they burn with an intense radiant heat.

The fuel and air channels may be formed by any suitable means such as tubes or channels in or on the body 1, or as shown, by removing the corners of the refractory or heat insulating bricks 22 and these bricks may terminate with an uneven surface comparatively close to the tips of the corrugations or the like on the exterior of the refractory receptacle 16 thus forming a passage 23 and forcing the burning gases in the heating chamber into contact with the incandescent refractory surfaces of the receptacles 16 and the uneven brickwork 22 at 23 and further increasing the rate of combustion in the heating chamber 11 and the passage 23 and the temperature of the heating chamber 11 and receptacle 16, the products of combustion from the heating chamber 11 are finally passed over the end of the receptacle 16 and through 10 to the interior of the receptacle where the mixing and reacting with the carbonaceous material and gases generated they emerge together from the generator at 12' along with the gases generated from the liquid or colloidal carbonaceous materials injected into the generator past the sharp edged dispersion valve 24 and nozzle or valve case 25 in the form of a conical spray or thin film 26, the quantity of the material thus admitted being controlled by rotating the lever 24A which takes effect upon the screwed stem of the valve 24 at 24B.

It will be understood that when liquid fuels are used to heat the incandescent surface combustion heating chamber they must be of a volatile nature or sufficiently volatile to be converted to a gas or vapor by means of heat such as the internal heat of the generator and that when they pass into the heating chamber they are vaporized or gaseous in nature.

Referring to Fig. 3. The pulverized fuel, such as coal, lignite, or peat, and its transporting gas (such as $CO_2$, $N_2$, $O_2$, or $H_2$) or air stream enters the generator at 6 and is dispersed into the distillation zone 27 of the generator by way of the annular distribution nozzle 28, as the material passes through the distillation zone its volatile content is distilled out and the resultant gases leave the generator by way of the heated refractory ascension tube 29 and the remaining incandescent coke-like particles, being comparatively heavy, pass on into the gasification zone 30 where they meet and react with the steam ascending from the steam zone 31 whilst the combustible gases resulting from the reactions in the gasification zone 30 also pass out of the generator by way of the heated ascension tube 29 mingling and reacting to some extent with the distilled gases whilst passing through the tube 29. It will be understood that the completeness of the reactions taking place in the gasification zone will depend upon the amount of steam, or oxygen, admitted thereto, and, that air or products of combustion from the heating chamber, or calcareous materials, or carbon-dioxide, may, if desirable, be admitted to the gasification zone in place of or along with the steam. The ash or coke-like particles passing through the steam zone 31 encounter a flow of steam entering the refractory receptacle 16 from the steam distribution ring 32 by way of nozzles or the like 33, and, giving up their sensible heat to superheat the steam, are cooled sufficiently thereby to prevent their adhesion to the walls of the generator or into lumps, the steam is fed into the distribution ring 32 at 7 from a waste heat boiler or the like. The ash or coke residue falls into a bed of coke particles or the like already placed in the bottom of the generator up to the level 34 and as their level is increased during operation and the ash or coke particles submerge the end of the ejector pipe 35, the surplus is ejected by means of low pressure air or steam or the like entering the pipe at 36, the particles entering the ejector compartment 36A through its submerged entrance 37, and by this means a fairly constant level of residue is maintained in the bottom of the generator without loss of generated gas through the ejector compartment 36A.

Alternately, the ash or residue may be discharged and the generator be sealed against loss of gas during the operation by means of a rotating and sealing trough of a known construction.

When the carbonaceous material is not completely consumed in the gasification processes the whole or a part of the residue may be utilized to heat the heating chamber into which it is fed by way of a branch pipe or the like 38 connected to the ejector outlet pipe 39 for which purpose the ejector is preferably operated by compressed air means, and the quantity of residue and primary air thus fed into the heating chamber is controlled by means of a throttle valve or the like 39A situated in the outlet pipe 39, any surplus residue being disposed of at the end of the pipe 39.

The heat of the heating chamber is maintained and its initial heating is effected by means of fuel fed into the heating chamber through nozzles or the like similar to that shown at 40 for the feeding in the particles of coke residue from the receptacle 16, and, where no coke residue is available these nozzles or burners will of course supply the whole of the liquid, gaseous, or pulverized, fuel required to heat the heating chamber. The ash content of the fuel supplied to heat the heating chamber is cooled sufficiently to prevent its adhesion as it passes through a screen of water pipes or the like 41 which are fed with water from inlet and outlet rings 42 and 43 through water inlet and outlet apertures 44 and 46, the heat imparted to the water being returned to the generator in the steam supplied to the steam screen 8.

The primary air for the heating chamber heated by contact with the hot ash and residue from the receptacle by way of the ejector 35 and branch pipe 38 and enters the heating chamber 16 along with the fuel, whilst the secondary air enters the air space 47 through the apertures 48 and finally enters the heating chamber by way of the apertures 49, the combustion of the fuel commences in the bottom of the heating chamber, the burning gases expanding in a downward direction around the receptacle 16 their flow is reversed and the comparatively heavy particles of ash and residue separate out and pass forward between the water pipes 41, the gases mingle with the preheated secondary air and their combustion is completed in the passage 23 under incandescent surface combustion conditions in contact with the uneven surfaces of the refractory receptacle 16 and the brickwork 22, the products of combustion finally leaving the heating chamber by way of their outlet aperture 13 on their way to a waste boiler prior to their discharge to the atmosphere. Referring now to all the drawings:—

The quantity of fuel and air consumed in the heating chamber will vary according to the size of the generator and the capacity of the heating chamber, and the methods of supplying the air and fuel to the heating chamber will vary with the pressure system of operation, when the generator operates below atmospheric pressure, for example, the suction of an exhauster or an internal combustion engine may withdraw the gases generated together with the products of combustion from the heating chamber through the aperture 12, or an exhauster or a chimney may withdraw the products of combustion separately through the aperture 13, and the gases generated be withdrawn through the aperture 12, as above, and both these methods of operation induces the air and fuel through their respective inlets 9, 10, 48, 49 and 40 into the heating chamber 11, whilst the quantity of air and fuel thus induced to the heating chamber may be varied or controlled by means of valves or the like attached to the respective inlet or outlet apertures, or by the capacity of the exhauster means. The generator may be arranged to operate at high pressure and the combustible gases for the heating chamber along with carbonaceous material to be gasified may be injected into the generator by means of suitable blowers, fans, or pumps, or the like, and whilst the carbonaceous fuel to be gasified may be induced into the generator by means of the vacuum under which the heating chamber is operated it is preferable to do this at a pressure slightly above atmospheric pressure such as a head of the liquid or colloidal fuel, or in the case of pulverized fuels by means of a fuel transporting gas stream passing right through the pulverizing and drying machine into the generator, and the fuel supply to the heating chamber may also be injected into the generator slightly above atmospheric pressure, the amount of material fed into the generator for gasification and the amount of gas used for transporting the material is controlled by means of suitable valves attached to the generator or pulverizing and fuel drying machine inlets or by the capacity of the pressure generating fans, blowers, pumps, or the like.

The heat losses to the exterior of the generator are reduced due to the preheating of the heating chamber fuel and air streams passing through fuel and air channels, 18, 19, 20, 20A, and 47, and the operating temperature of the heating chamber is correspondingly increased, the ends of the heating chamber may be insulated by rings 50 or their equivalent, made from heat insulation refractory material leaving space 51 to allow for expansion of the heating chamber, and passage for the air, whilst the exterior of the generator may be provided with additional air or water jackets or be externally lagged with heat insulating material, such as asbestos and magnesia or diatomaceous earth.

The period that the materials are acted upon by the intense heat emitted from the heating chamber and receptacle, and the reactions taking place within a generator of any given length may be prolonged by feeding in the materials with a rotating movement, and by reversing the direction of their flow within the generator, i. e. the materials may be fed into the fuel distribution ring 53 or nozzle 25 tangentially or their direction of flow be reversed within the generator as happens when the distilled gases enter the mixing zone 52, and the heating chamber 11 from the nozzles or the like 40. The receptacles, and refractory bricks used in the construction of the generator are made from cements of the highly refractory materials bound together with ceramic bonds, formed to the desired shape and dried, then fired at high temperatures, and to facilitate the handling and manufacture of the unburnt shapes the cements may be mixed with solutions of sodium silicate, magnesium chloride, or the like, whilst the heat insulation bricks and the rings 22 or the like 50 are made in a similar manner from diatomaceous earth, asbestos, and the like, or mixtures of these materials and cements and ceramic bonds, whilst for some processes or reactions it is advantageous to make the receptacle 16 and the mixing tube 29 from nickel or material with a high nickel and chromium content; and heat resistant iron or steel alloys may be used in the construction of such generator parts as valves or nozzles, grates, troughs and other parts of the generator subject to heat and erosion.

The gasification processes may be completed in stages in one or more generators, or a single heating chamber may supply to necessary heat energy to operate a plurality of gasification zones or receptacles. The generator may be arranged and constructed for the continuous gasification of unpulverized solid carbonaceous and calcareous materials in a receptacle such as 16 the material resting upon a grate carried by and rotating with a sealing and ash discharging trough the air, steam, or other gases, required during the gas reactions taking place in the receptacle being fed in through the bars of the grate through suitable nozzles under the grate, in quantities to suit any desired system of gasification, i. e. the generator may be arranged to generate water gas, or other gas rich in hydrogen, from vegetable matter, lignite, peat, or the like, or from briquettes of pulverized residue continuously; the heat absorbed by the reactions being supplied from the incandescent surface combustion heating chamber, and these gas reactions may also be influenced by catalysts at or near the gas outlet, or in the receptacle. The generator may be arranged to yield burnt lime as a by-product from the calcareous materials, or a mixture of lime and ash or coke residue particles suitable for building purposes may be obtained and the carbon-dioxide from the calcareous material being regenerated to combustible gases, in contact with pulverized or unpulverized or liquid or colloidal carbonaceous material. The generator may be arranged to gasify liquid colloidal and pulverized or unpulverized fuels simultaneously and the oils or steam may be injected into the generator in positions such as shown at 54, Fig. 1.

It will be understood that where corrugations are referred to herein and in the claims, that any equivalent roughening projections such as points or ridges are included within the meaning thereof for the purpose of producing an accelerating catalytic effect.

Having now particularly described and ascertained the nature of my said invention and in what manner the same is to be described, I declare that what I claim is:

1. A gas generator including a gas generating chamber, corrugated walls of catalytic material for said chamber, means to feed material to be gasified to the chamber, and means to heat the corrugated catalytic walls of said chamber to incandescence.

2. A gas generator including a gas generating chamber, externally corrugated walls of catalytic material for said chamber, a heating chamber surrounding the corrugated walls of said gas generating chamber and having an uneven wall surface facing the corrugated walls of the gas generating chamber, means to feed material to be gasified to the gas generating chamber, and means to heat the corrugated catalytic walls of said chamber to incandescence.

3. A gas generator including a gas generating chamber, walls of catalytic material for said chamber, said walls having a surface roughened to produce an accelerating catalytic effect, means to feed material to be gasified to the chamber, and means to heat the roughened walls of said chamber to catalytic incandescence.

In testimony whereof I affix my signature.
FRED UMPLEBY.